(12) United States Patent
Varnadoe, Sr. et al.

(10) Patent No.: US 11,445,661 B2
(45) Date of Patent: Sep. 20, 2022

(54) STALK ELIMINATOR

(71) Applicants: Richard Varnadoe, Sr., Lenox, GA (US); Richard Varnadoe, Jr., Lenox, GA (US)

(72) Inventors: Richard Varnadoe, Sr., Lenox, GA (US); Richard Varnadoe, Jr., Lenox, GA (US)

( * ) Notice: Subject to any disclaimer, the term of this patent is extended or adjusted under 35 U.S.C. 154(b) by 0 days.

(21) Appl. No.: 16/896,207

(22) Filed: Jun. 8, 2020

(65) Prior Publication Data
US 2021/0378177 A1 Dec. 9, 2021
US 2022/0087103 A9 Mar. 24, 2022

Related U.S. Application Data

(60) Provisional application No. 62/858,631, filed on Jun. 7, 2019.

(51) Int. Cl.
| | |
|---|---|
| *A01D 43/12* | (2006.01) |
| *A01B 3/26* | (2006.01) |
| *A01B 27/00* | (2006.01) |
| *A01B 43/00* | (2006.01) |
| *A01B 49/04* | (2006.01) |
| *A01D 34/44* | (2006.01) |

(52) U.S. Cl.
CPC ........... *A01D 43/12* (2013.01); *A01B 3/26* (2013.01); *A01B 27/005* (2013.01); *A01B 43/00* (2013.01); *A01B 49/04* (2013.01); *A01D 34/44* (2013.01)

(58) Field of Classification Search
CPC ........ A01D 43/08; A01D 43/12; A01D 34/44; A01B 43/00; A01B 3/26; A01B 27/005; A01B 49/04
See application file for complete search history.

(56) References Cited

U.S. PATENT DOCUMENTS

| | | | | |
|---|---|---|---|---|
| 2,781,709 A * | 2/1957 | Caldwell et al. | ...... | A01B 49/04 172/28 |
| 3,294,046 A * | 12/1966 | Boots | ...... | A01C 11/00 111/200 |
| 4,015,667 A * | 4/1977 | Ruozi | ...... | A01D 33/06 172/133 |

* cited by examiner

*Primary Examiner* — Tara Mayo-Pinnock
(74) *Attorney, Agent, or Firm* — Clark & Bellamy, P.C.; Brian D. Bellamy

(57) ABSTRACT

The stalk eliminator chops stalks, uproots stalks, and re-chops stalks. The apparatus includes a front stalk chopper on a rotating cylinder with angularly attached blades. A plow tool attaches to the apparatus and provides a subsoiler wing behind and under the front stalk chopper. A rear stalk chopper on a rotating cylinder with angularly attached blades follows the plow tool.

10 Claims, 11 Drawing Sheets

STALK ELIMINATOR

PRIORITY CLAIM

The present application claims the benefit of U.S. provisional patent application No. 62/858,631 filed on Jun. 7, 2019.

TECHNICAL FIELD

The present invention relates to an agricultural tractor-towed apparatus for eliminating stalks and, more particularly, to such a device having an array of angles blades on a rotating cylinder operating in coordination with a subsoiler wing.

BACKGROUND

After harvesting cotton, the stalks are left in the field and require additional processing for removal so that a subsequent crop can be planted. Cotton stalks create residue in areas that need management to suppress pests, such as boll weevil and bollworm, and control soil erosion. The stalks remain after harvesting the cotton crop. Removal before planting the succeeding crop requires the destruction of the stalks. Ideally, producers should destroy stalks immediately after collecting to control insects and diseases. Several pathogens can take hold, such as root rot, in undestroyed stalks. Or, regrowth can take hold, providing food for pests. Optimally, the stalks are destroyed through a single pass with a tractor to encourage early destruction and minimal consumption of time and fuel. The farmer should shred cotton stalks on the soil surface to provide protection against erosion and allow microorganisms access to decompose the stalk, whereby the decomposition provides beneficial minerals and organic compounds for the soil.

Present practices require several passes by mowers and disc harrows to effectively process these stalks. These several passes cause wear and tear on expensive cotton harvesting machines and require the use of fuel that is costly and harmful to the environment. Thus, what is needed is a method for the removal of cotton stalks more efficiently.

U.S. Patent Application publication 20110258979A1 to Darden provided a cotton stalk remover apparatus placed in-line behind the harvesting head or as a separate machine. The Darden apparatus chopped the top portion of cotton stalks and pulled the stalk from the ground using a combination of gathering spindle and puller spindle.

Darden and others do not teach an apparatus to remove cotton stalks by using a blade, mainly designed to provide three stages of stalk elimination to chop, uproot, and re-chop a cotton stalk and root. Thus, a further need exists to improve on cotton stalk elimination whereby a cotton field is left ready for cover crop or replanting after one pass.

SUMMARY OF THE INVENTION

The object of the present invention is to provide a tool for attachment to a tractor that eliminates standing cotton stalks and the buried roots from those stalks.

A further object is to provide such a tool that chops, uproots, and re-chops stalk and root, leaving a field ready for cover crop or replanting. Other choppers may clog up with clary or damp soil, the stalk eliminator of the present invention self-cleans.

Per the present invention, there is provided a tractor-towed agricultural apparatus with a frame supporting a front rolling cylinder and a rear rolling cylinder. Each cylinder includes blades attached at a specific angle determined by the arrangement as preferred for self-cleaning. The combination of the cylinder and blades provide front and rear stalk choppers. Further, a plow tool is arranged under the front rolling cylinder and blades. The plow tool includes a foot with a subsoiler wing in accordance with the invention that runs in the subsoiler furrow made during planting, making the apparatus easier to pull by tractor and reducing wear on the foot. The subsoiler wing runs directly under the root of the stalks dislodging the root. The rear rolling cylinder and blades thereon provide the rear stalk chopper that re-chops the stalk and further decimates the dislodged root.

In another advantage of the invention, the stalk eliminator can run as fast as ten miles per hour and successfully chop stalks and roots.

In another object, the stalk eliminator cylinders operate on bearing affixed to each end of the cylinder and located on the outside of the apparatus for easy access and maintenance.

In another embodiment, the stalk eliminator includes a crumbler attached behind the rear stalk chopper for crushing clods and leveling the field.

These features and advantages of the present disclosure may be appreciated by reviewing the following description of the present disclosure, along with the accompanying figures wherein like reference numerals refer to like parts.

BRIEF DESCRIPTION OF THE DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
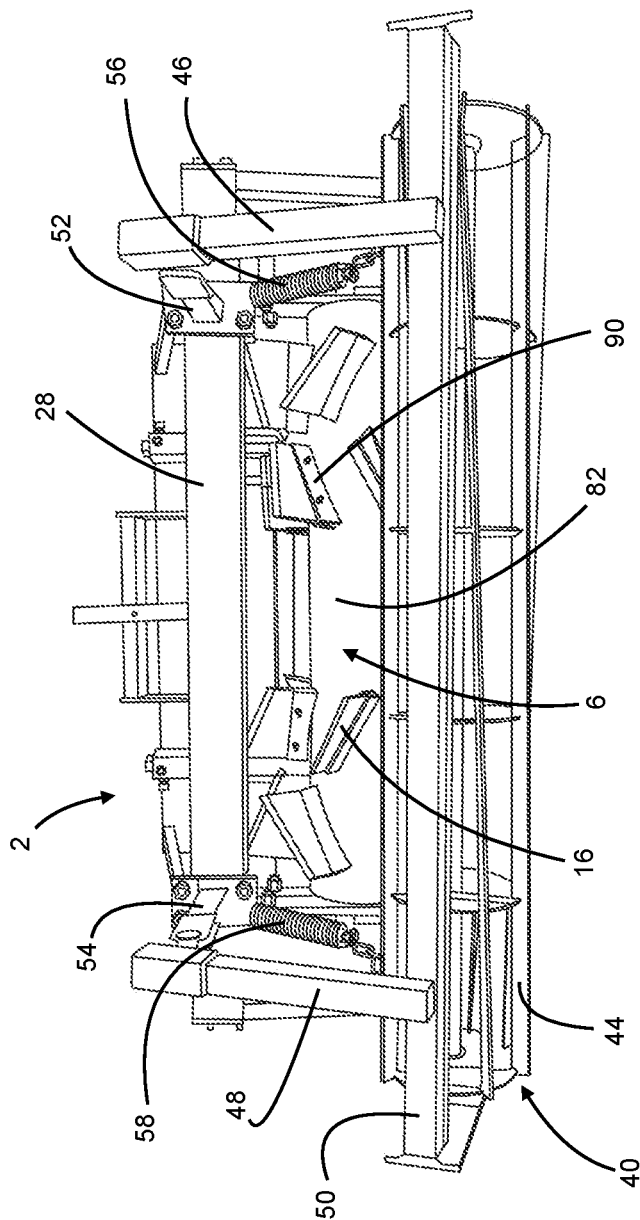
FIG. 1 shows a rear perspective view of an embodiment of the stalk eliminator invention with crumbler attached.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

The disclosed and claimed invention herein provides a stalk eliminator 2 as an apparatus to chop, uproot, and re-chop stalk and root leaving a cotton or other stalk-crop field ready for planting. The stalk eliminator comprises a combination of at least one front stalk chopper 4 and at least one rear stalk chopper 6. A gang of several front and rear stalk choppers may be arranged in larger arrangements of the apparatus with the related additional components as described. The stalk eliminator apparatus includes a plow tool 10 situated behind the front stalk chopper with a foot 12 of the plow tool arranged with a terminal end 14 below the level of the front stalk chopper 4 and blades 16 attached to the front stalk chopper. A frame 20 supports the components of the stalk eliminator apparatus and provides attachment of the apparatus to a tractor for towing.

Figure 2:
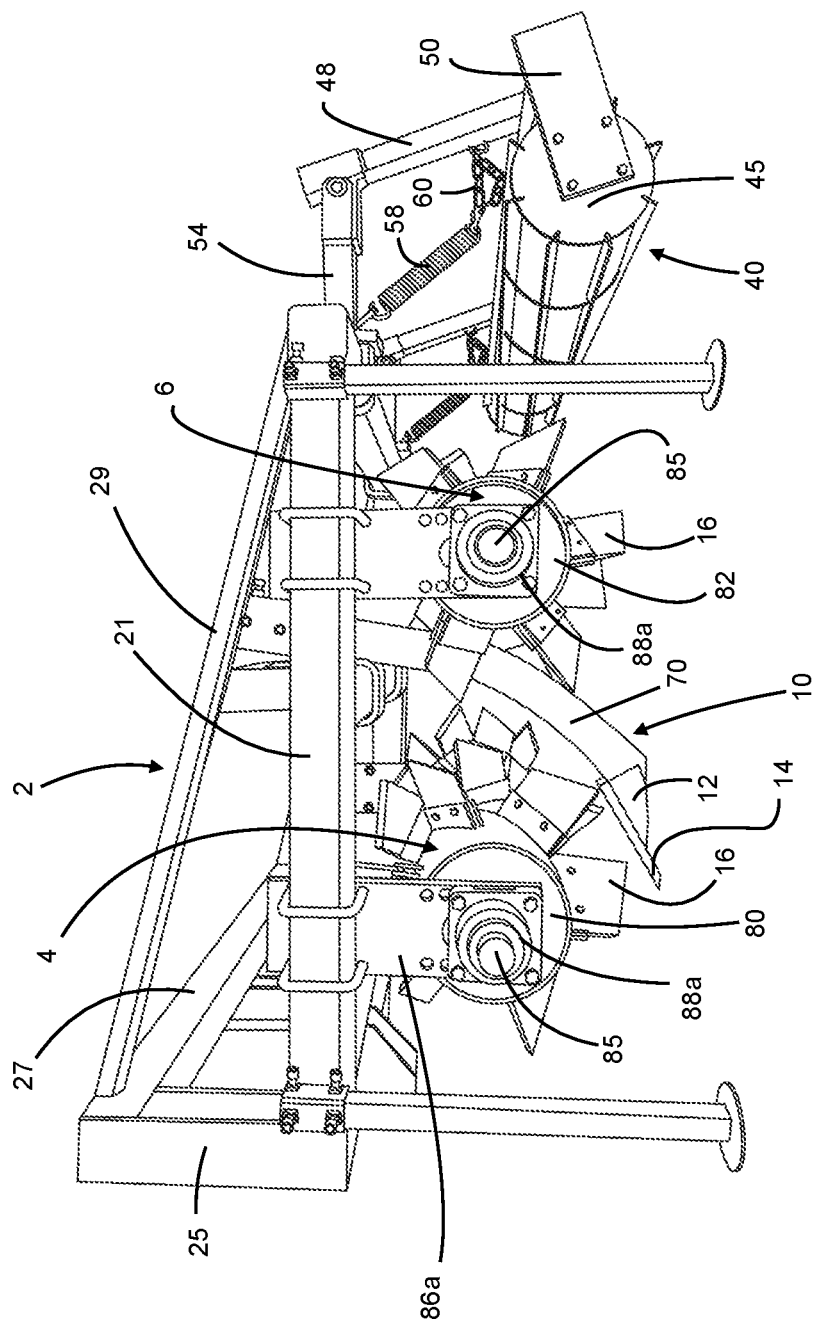
FIG. 2 shows a right side perspective view of the embodiment with a crumbler.
Figure 3:
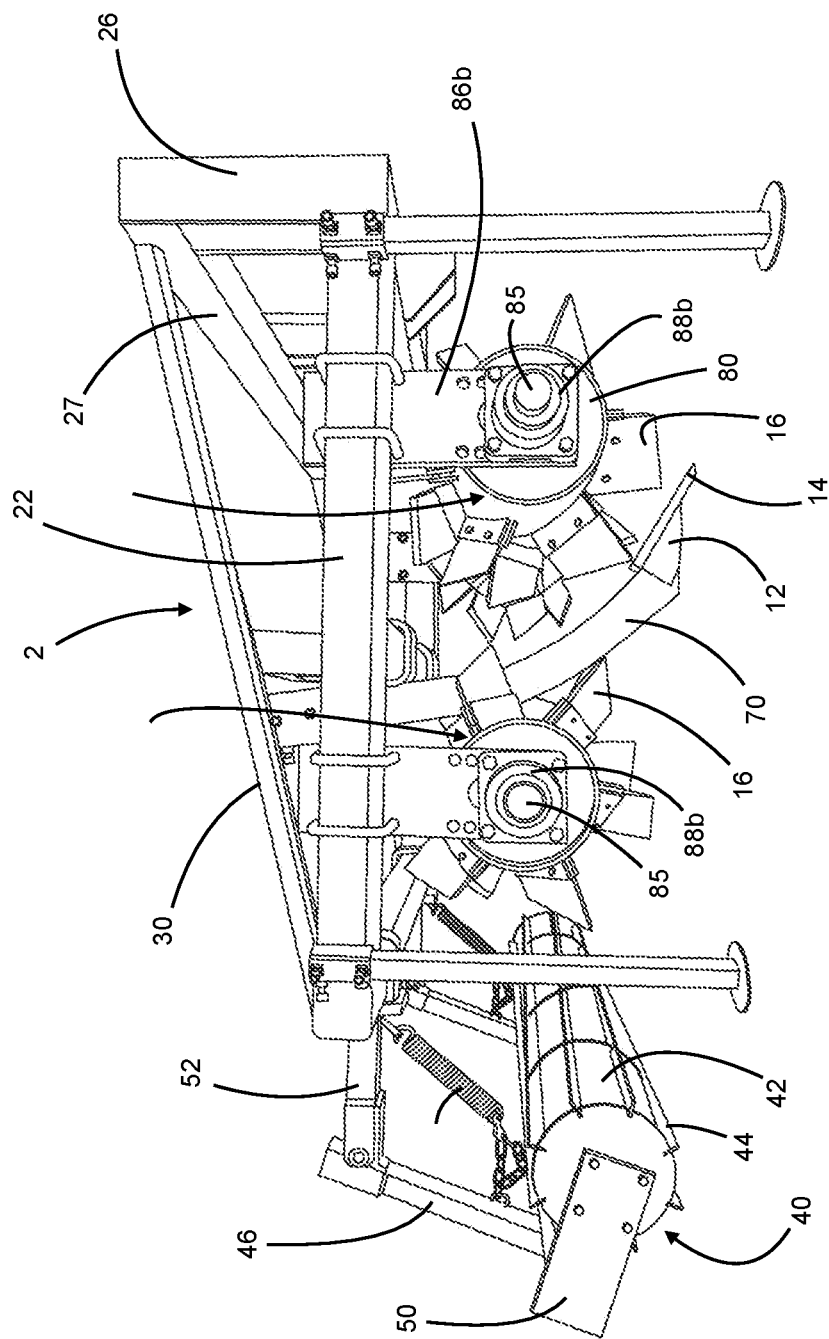
FIG. 3 shows a left side perspective view of the embodiment with a crumbler.

As shown in FIGS. 1-3, the apparatus may include an additional crumbler 40 placed in float or lifted while on the go. The operator may customize the stalk eliminator 2 to support a preferred crumbler for crushing and breaking up clods, firming the seed bed, or leveling the field. The optional crumbler 40 shown in the drawing comprises a basket or open cage roller. The crumbler has a rolling basket 42 formed by elongate horizontal rods 44 circumferentially arranged about a center shaft 45. The crumbler unit turns freely with its weight concentrated on each successive rod 44 for working the soil.

The figures show the structural frame 20 of the stalk eliminator. The frame 20 comprises elongate side members on opposing parallel sides of the frame structure that include a left side frame member 21 and right side frame member 22. The left and right side frame members are connected by several perpendicular cross members including a front frame cross-member 23, an intermediate frame cross-member 24, and a rear frame cross member 28. Vertical left frame member 25 and vertical right frame member 26 of several vertical frame members attached at their bottom to the front frame cross-member 23 and extend upward on each end of the front frame cross-member. A further upper front frame cross-member 27 connects between the top of the vertical left frame member 25 and vertical right frame member 26 joining together to form a rectangularly shaped front frame. Left angular support member 29 and right angular support member 30 attach between each end of the upper front frame cross-member 27 and the respective left side frame member 21 or right side frame member 22 for additional support and structural integrity of the apparatus.

The optional crumbler system 40 may include right and left crumbler support tubes 46, 48 that attached to the frame 50 of the crumbler for supporting the crumbler system 40 and attaching the crumbler system to the stalk eliminator 2. Right and left crumbler support brackets 52, 54 may attach to the rear frame cross member 28 for attachment of each respective right and left crumbler support tubes 46, 48. Right and left spring supports 56, 58 may further attach between the rear frame cross member 28 of the stalk eliminator frame 20 and the crumbler frame 50 via chains 60 attached to the crumbler frame. Whereby, a farmer may adjust the crumbler system 40 for operation.

Figure 4:
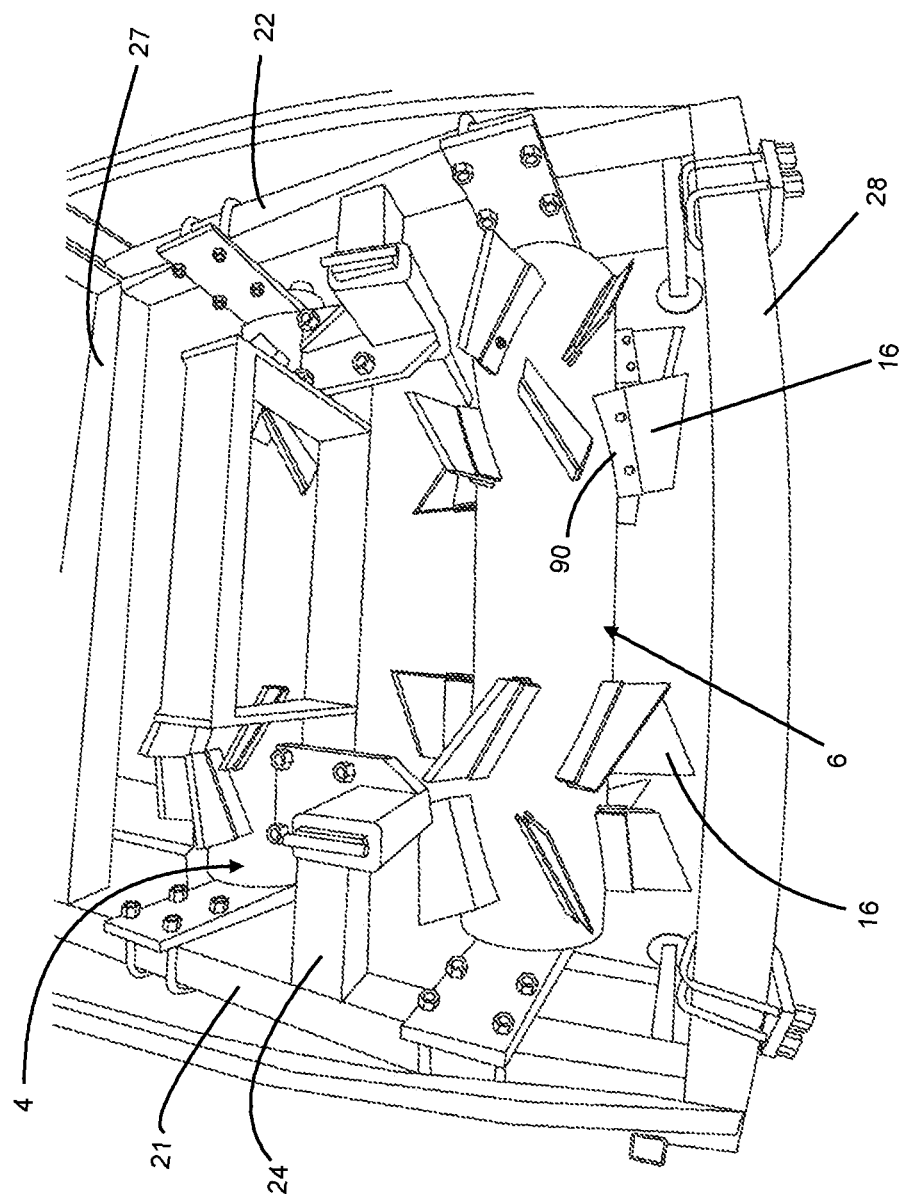
FIG. 4 shows a top perspective partial view of the embodiment, including the rear stalk chopper and front stalk chopper.
Figure 5:
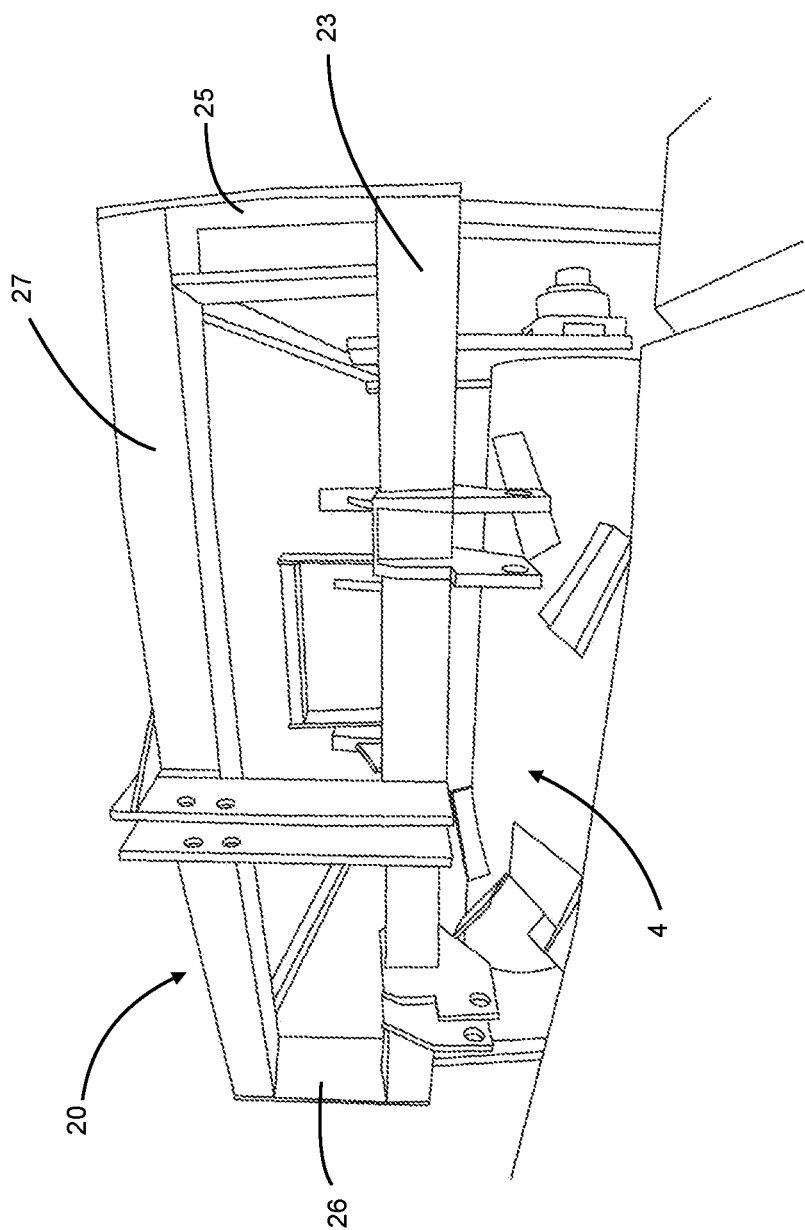
FIG. 5 shows a front perspective view of the embodiment, including three brackets for attachment to a tractor.
Figure 6:
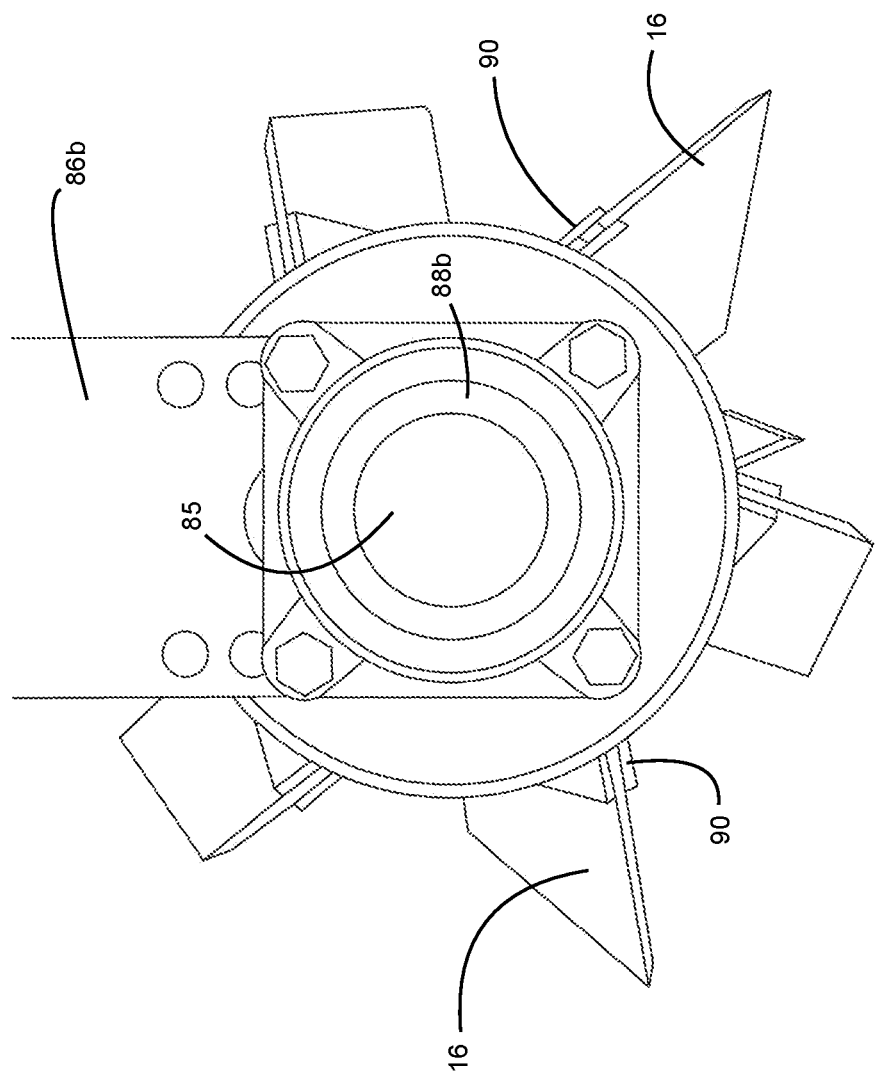
FIG. 6 shows a side end view of a stalk chopper portion of apparatus with a shaft, bearing, cylinder, and blades attached.
Figure 7:
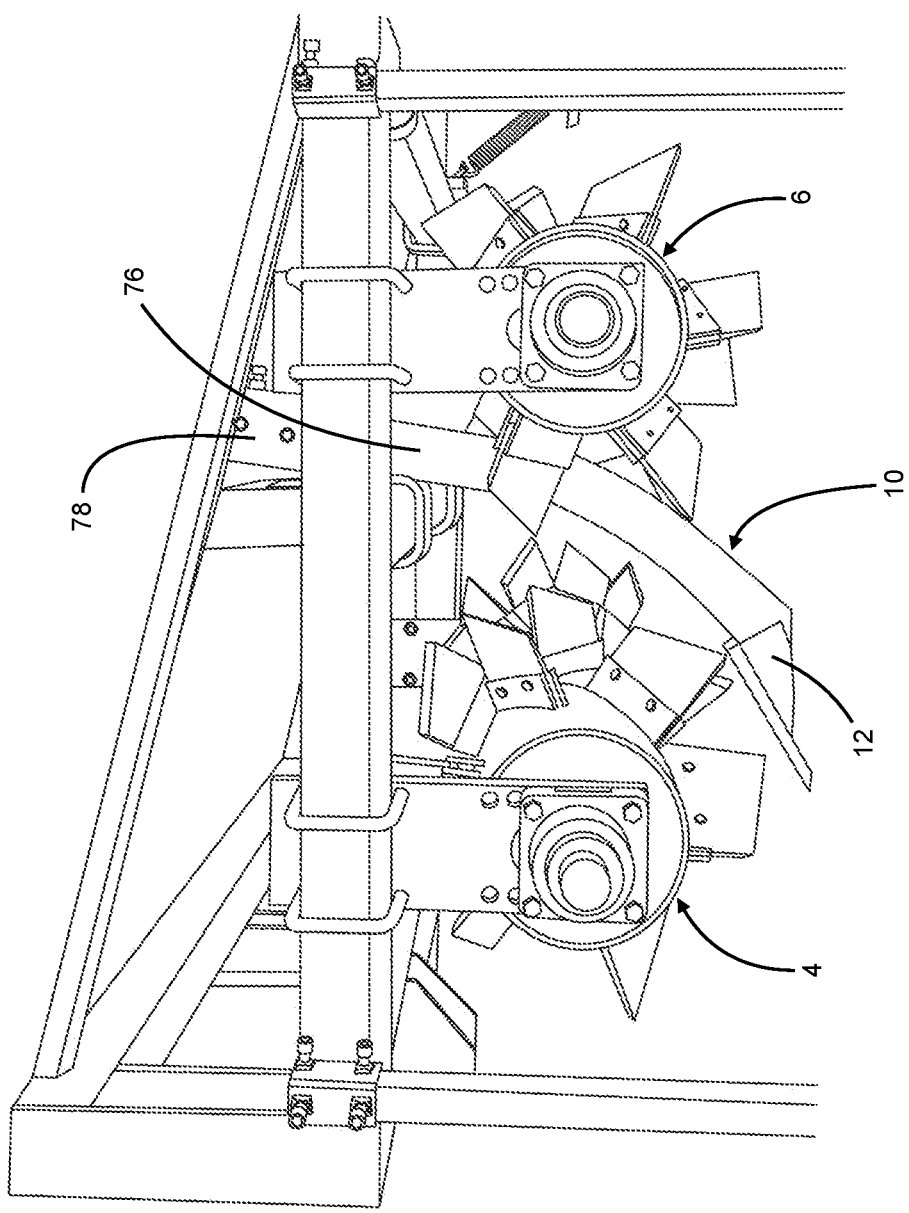
FIG. 7 shows an enlarged right side partial perspective view of the apparatus with the front stalk chopper, the plow tool, and the rear stalk chopper.

FIGS. 2 and 3 show the plow tool 10 arranged behind a front cylinder 80 of the front stalk chopper 4. The plow tool 10 includes a curved elongate vertical shaft 72 comprised of narrow flat plate steel forming the body of the plow tool. The lower end of the plow tool terminates in the foot 12 comprising the operating end. A subsoiler wing 74 attaches to the foot for dislodging roots. A shank handle 76 forms the upper end of the plow tool and attaches to a shank bracket mount 78. Referring now to FIG. 4, the shank bracket mount 78 attaches on the intermediate frame cross-member 24. The shank bracket mount 78 holds the shank handle 76 for adjustment of the height of the shank and the foot 12 thereof. Each column of blades 16 on a cylinder include a plow tool 10 arranged for dislodging roots from the stalk plant. The shank handle 76 of each plow tool 10 is attached to spatially arranged shank bracket mounts 78 on the intermediate frame cross member 24. In particular, in the embodiment depicted, the shanks are situated between the blades 16 of the respective rear stalk chopper 6 blade column so as to prevent interference with the blades and, also, allow the blades to clean the shank.

The front stalk chopper 4 and rear stalk chopper 6 each include a cylinder, referred to on a front stalk chopper as a front cylinder 80 and a rear stalk chopper as a rear cylinder 82. The cylinders include a shaft hold for receiving a shaft 85 for rotation of the cylinder while towing the stalk chopper. The cylinder attaches on each end by support members held by brackets attached to the left and right frame side members 21, 22. A left support 86*b* attaches to a left bearing 88*a* on the left end of the shaft and a right support 86*b* attaches to a right bearing 88*b* on the right end of the shaft. The shaft rotates in the bearings. The left support 86*a* vertically extends to attach to a left support bracket 87*a* attached to the left side member 21 of the frame. Whereas the right support 86*b* vertically extends to attach to a right support bracket 87*b* attached to the right side member 22 of the frame. Each front and rear cylinder 80, 82 attaches to the frame 20 of the stalk eliminator 2 in the same manner.

Figure 8:
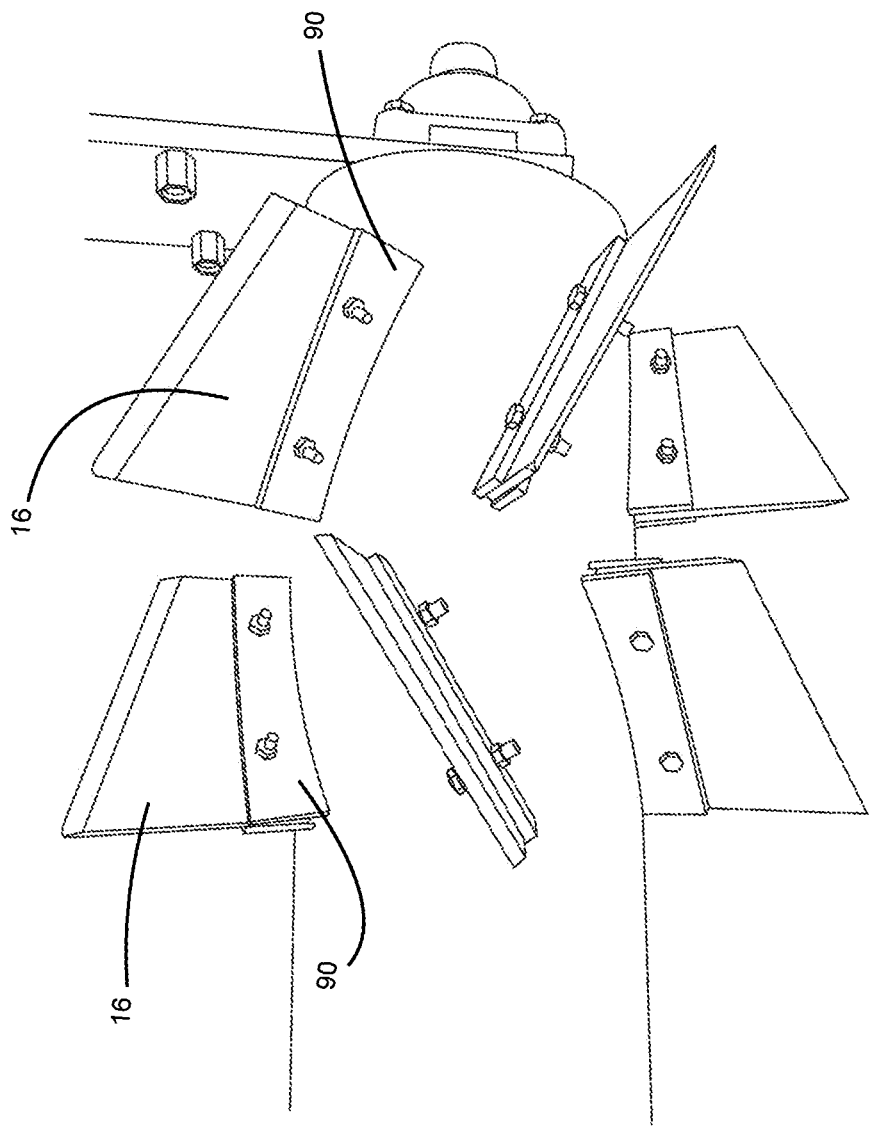
FIG. 8 shows an enlarged cut-away rear perspective view of a stalk chopper portion of the apparatus with the cylinder, several of the attached blades, left cylinder support member, shaft, and bearing.
Figure 9:
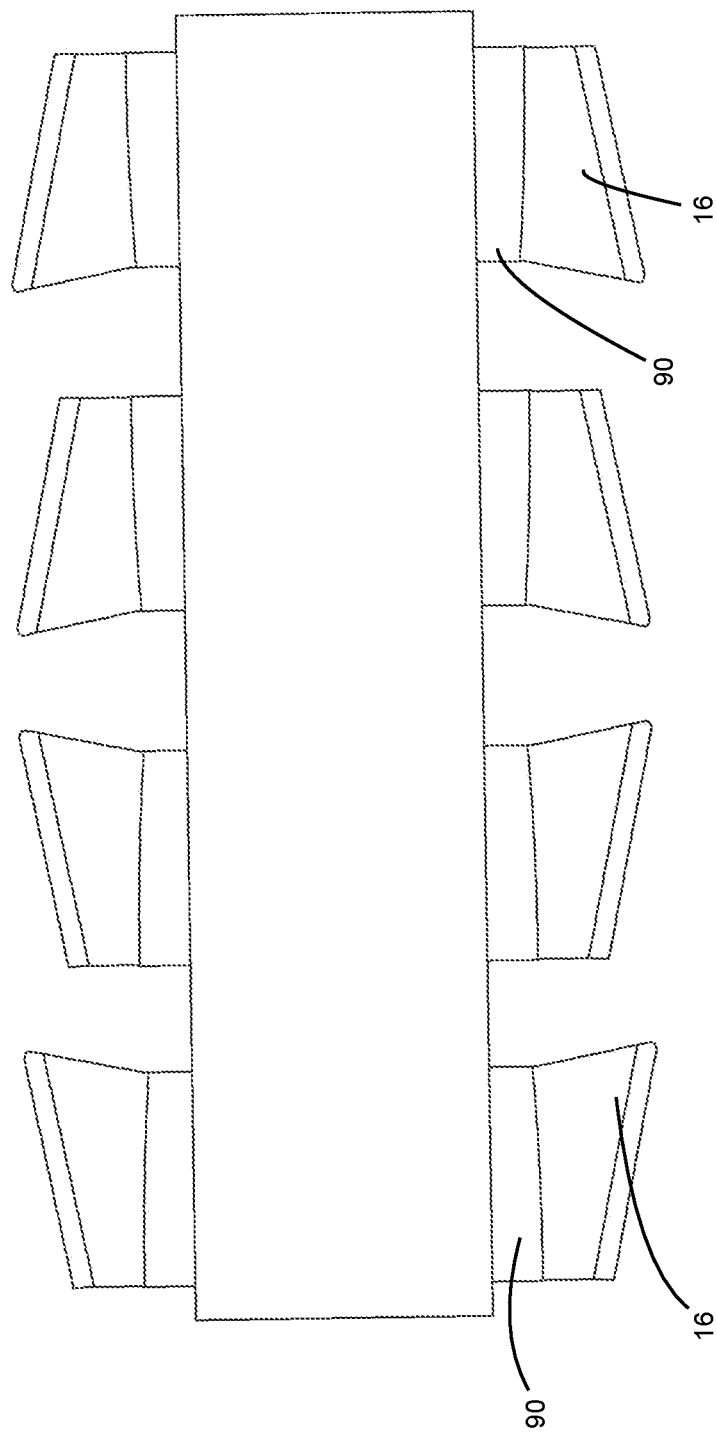
FIG. 9 shows an enlarged cut-away top view of a stalk chopper portion of the apparatus with several of the attached blades.
Figure 10:
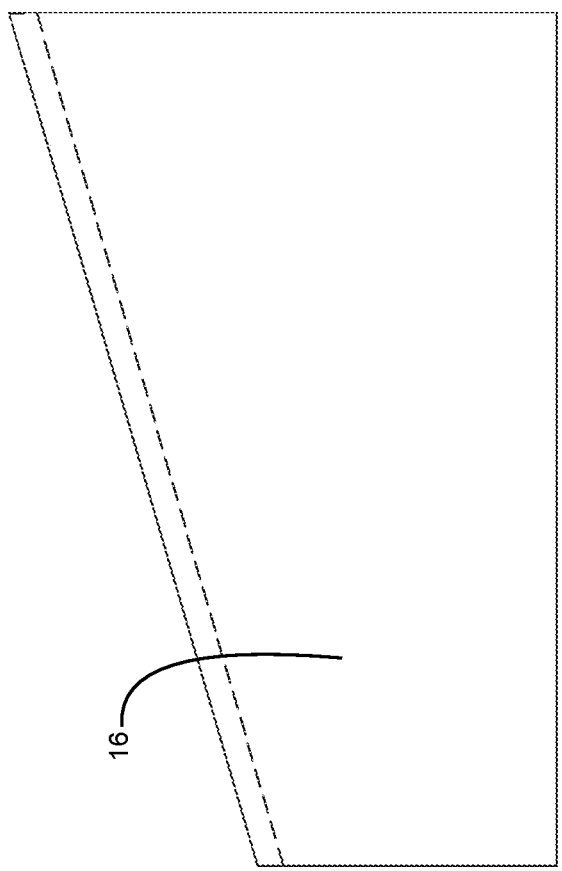
FIG. 10 shows an enlarged plan view of the face of a blade in accordance with an embodiment of the invention.

Each front and rear stalk chopper 4, 6 includes blades 16 angularly arranged on the respective cylinder 80, 82 in several columns spaced according to the rows of a crop. The special angular arrangement and angular blade design promote self-cleaning and prevents clogging of the stalk eliminator 2 because of clay and damp soil. Other choppers with straight blades are prone to clogging. In the embodiment discussed, each blade is made of boron steel. The blades 16 are ten to twelve inches long, but modestly shorter or longer blade configurations function. The blades 16 must include an angular shape. The exemplary blade 16 shown in FIG. 10 has a long end that is eight inches height and a short end that is five inches height. As shown, the blades 16 are set on the cylinder 80, 82 at 75 degrees from the parallel centerline of the cylinder. The angle of the blades 16 set on the cylinder 80, 82 may vary about 10 degrees each direction and maintain the anti-clogging operation, although potentially less efficiently. In the embodiment, the angle of the blades 16 set is fixed by holders 90 attached on each cylinder 80, 82. The holders 90 determine the angle of the blades 16 and provide a bracket extending from cylinder for insertion of the blade and attachment by bolts. Once attached, the blades 16 overlap each other as shown in FIG. 4 and FIG. 8. The blade columns are also set apart on the cylinder 80, 82 so that the shank 70 of the plow tool 10 can lie between the blades 16, keeping the shank clean.

Figure 11A:
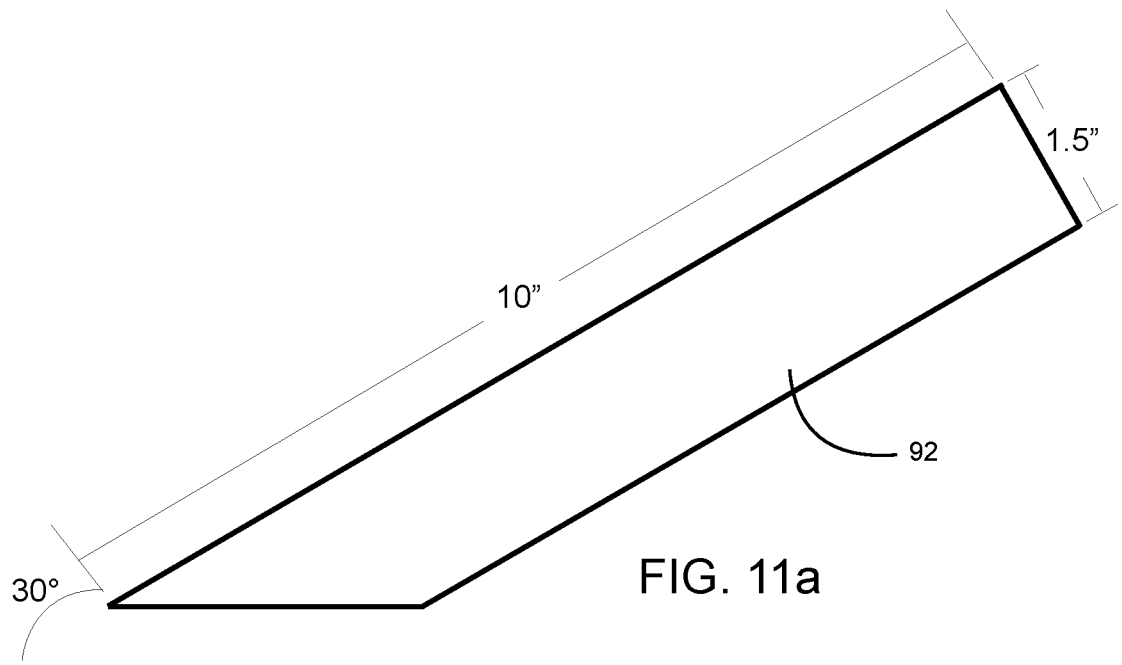
FIG. 11a shows a side view of a subsoiler wing for attachment to a foot of the plow tool in accordance with an embodiment of the invention.
Figure 11B:
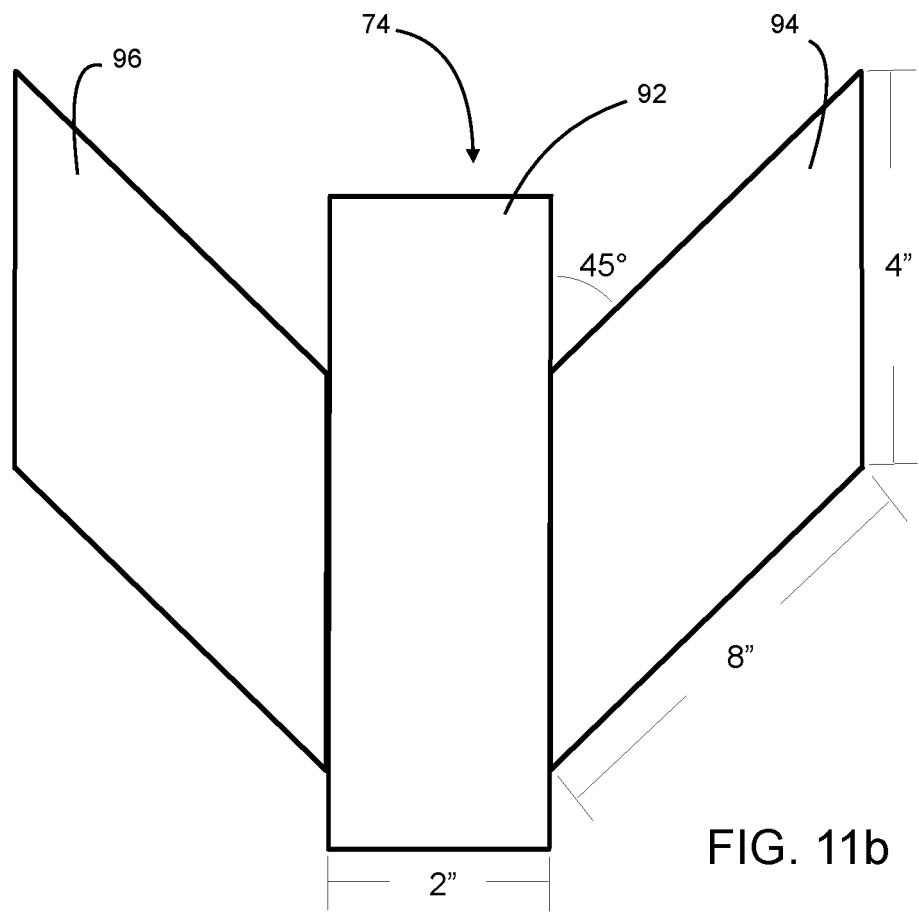
FIG. 11b shows a top view of a subsoiler wing for attachment to a foot of the plow tool in accordance with an embodiment of the invention.

The shank 70 discussed above includes a foot 12 that extends under the front cylinder 80 and blades 16 with a subsoiler wing 74 mounted on the foot. The subsoiler wing 74 includes a center plow tine 92, a left wing 94, and a right wing 96 as shown in FIG. 11*b*. The subsoiler wing 74 approaches the soil at 30 degrees as shown in FIG. 11*a* and plows up a cotton stalk and root ahead of the rear stalk chopper 6.

We claim:

1. A stalk eliminator comprising:
   a frame,
   a front stalk chopper includes a front rolling cylinder attached to a left frame side member of the frame and a right frame side member of the frame with a shaft supported by the frame for rotation of the front rolling cylinder while towing, including columns of angularly attached blades,
   a plow tool situated behind each column of angularly attached blades of the front stalk chopper and including a foot with a subsoiler wing, and a terminal end of the foot extends below the level of the front stalk chopper blades, and
   a rear stalk chopper includes a rear rolling cylinder attached to a left frame side member of the frame and a right frame side member of the frame with a shaft supported by the frame for rotation of the rear rolling cylinder while towing, including columns of angularly attached blades, whereby the subsoiler wing runs directly under a root of stalks dislodging the root, and the rear stalk chopper re-chops the stalks and further decimates the dislodged root.

2. The stalk eliminator of claim 1 further comprises:
   a right bearing affixed to a right end of said shaft of the front stalk chopper and a left bearing affixed to a left end of said shaft of the front stalk chopper,
      a right bearing affixed to a right end of said shaft of the rear stalk chopper and a left bearing affixed to a left end of said shaft of the rear stalk chopper, and
      the bearings located on an outside of the frame provide access for maintenance.

3. The stalk eliminator of claim 1 in which said plow tool situated behind each column of angularly attached blades of the front stalk chopper further comprises:
   a curved elongate vertical shaft formed by a narrow flat plate steel terminating in the foot at an operating end, and a shank handle forming the upper end of said plow tool and the upper end attached via a shank bracket mount to the frame,
   and the shank handle mount holds the shank handle for adjustment of the height of the shank and the foot, and
   the shank handle of each plow tool is spatially arranged between the blades of the respective rear stalk chopper columns of angularly attached blades, whereby the blades clean the shank handle.

4. The stalk eliminator of claim 1 further comprises an adjustable crumbler attached behind the rear stalk chopper, whereby the crumbler crushes clods and levels a field during use of the stalk eliminator.

5. The stalk eliminator of claim 1 further comprises said blades of said columns of angularly attached blades attach to each respective rolling cylinder at a specific angle from a parallel centerline of the respective cylinder.

6. The stalk eliminator of claim 5 in which:
   said blades are between ten and twelve inches long and comprise boron steel, and
   said blades attach to holders attached on each respective rolling cylinder, and the holders determine the specific angle from the parallel centerline of the respective cylinder the blades attach.

7. The stalk eliminator of claim 6 in which the specific angle from the parallel centerline of the respective cylinder the blades attach is 65 to 85 degrees.

8. The stalk eliminator of claim 6 in which the specific angle from the parallel centerline of the respective cylinder the blades attach is 75 degrees.

9. The stalk eliminator of claim 5 in which the blades include an angular shape having a long end that is eight inches in height and a short end that is five inches in height.

10. The stalk eliminator of claim 1 in which the subsoiler wing of the plow tool situated behind each column of angularly attached blades of the front stalk chopper mounts on the foot, and the subsoiler wing includes a center plow tine, a left wing, and a right wing, and each of the left wing and the right wing approaches a soil in a field at thirty degrees.

* * * * *